United States Patent [19]

Burns

[11] Patent Number: 4,532,774
[45] Date of Patent: Aug. 6, 1985

[54] PORTABLE FIELD SITE PRE-COOLING APPARATUS

[75] Inventor: Daniel E. Burns, Camarillo, Calif.

[73] Assignee: Demco, Inc., Oxnard, Calif.

[21] Appl. No.: 553,579

[22] Filed: Nov. 21, 1983

[51] Int. Cl.³ .............................................. B60H 3/04
[52] U.S. Cl. ........................................ 62/239; 62/447;
62/449; 280/415 B; 414/529
[58] Field of Search ......................... 62/239, 447, 449;
414/529; 280/415 B

[56] References Cited

U.S. PATENT DOCUMENTS

| 1,833,034 | 11/1931 | Parker | 62/329 |
| 2,567,178 | 9/1951 | Bird | 414/529 |
| 2,751,234 | 6/1956 | Couse | 280/415 B |
| 2,895,309 | 7/1959 | Kuhlmeier | 62/239 |
| 2,923,384 | 2/1960 | Black | 62/239 |
| 3,638,450 | 2/1972 | Falk | 62/447 |
| 3,792,595 | 2/1974 | Willis | 62/239 |

Primary Examiner—Ronald C. Capossela
Attorney, Agent, or Firm—Ralph B. Pastoriza

[57] ABSTRACT

The apparatus is for pre-cooling produce immediately after harvesting of the same and towards this end, constitutes a portable elongated enclosure normally positioned at the field site of harvesting. A detachable dolly supports the enclosure so that it can be moved to various different field sites as required. The enclosure itself supports pallets having containers arranged in two longitudinal rows to define a passage therebetween. An air handling housing in turn incorporates an exhaust fan, cooling coils and appropriate ducting so that refrigerated air is circulated over the tops and sides of the rows of the containers and drawn into the central passageway by the exhaust fan to then again pass into the air handling housing. In other words, a forced air circulation is used to remove the field heat from the containers.

4 Claims, 3 Drawing Figures

PORTABLE FIELD SITE PRE-COOLING APPARATUS

FIELD OF THE INVENTION

This invention relates generally to the treating of farm produce and more particularly to a portable field site pre-cooling apparatus for removing field heat from produce at the harvesting site.

BACKGROUND OF THE INVENTION

When produce, such as cauliflower, cabbage, bell peppers and the like is harvested, workers in the field will pack the produce in cartons. These cartons or boxes are generally rectangular in shape and normally have side openings for facilitating holding of the cartons. Generally they are stacked on pallets and the stacked cartons in turn then transferred to a flat bed truck or other transportation means to be shipped to a distribution point.

At the distribution point, the cartons are immediately placed in a large refrigerated building for the purpose of removing field heat from the produce as quickly as possible. The produce essentially is cooled to a temperature of from 40°–45° F. Thereafter, the produce can be shipped to various distribution points as by refrigerated trucks, railroad cars, or the like.

It is found in practice, that the shelf life of most produce is a function of how quickly the field heat can be removed from the produce once it has been harvested. If considerable time lapses from the time of harvesting to the time of initial cooling down of the produce, the overall shelf life at a retail store is substantially reduced. Any system, accordingly, which will speed up the process of pre-cooling or removing field heat from the produce after harvesting will substantially increase the shelf life and be beneficial to all concerned.

BRIEF DESCRIPTION OF THE PRESENT INVENTION

With the foregoing in mind, the present invention contemplates the provision of a portable apparatus for pre-cooling produce directly at the field site where the produce is harvested. By this arrangement, the lapse of time between harvesting and pre-cooling is materially reduced. Further, by the provision of a portable pre-cooling apparatus at the field site, the same apparatus can be used to transport the pre-cooled produce to the normal distribution point for further shipment.

In its broadest aspect, the portable apparatus includes an elongated enclosure for holding containers or cartons of freshly harvested produce. Refrigeration means is provided for passing cooling air through the interior of the enclosure to remove field heat from the produce. A dolly structure is provided for supporting the enclosure and refrigeration means so that the same can be transported to various different field sites or to a major distribution point.

BRIEF DESCRIPTION OF THE DRAWINGS

A better understanding of this invention will be had by referring to a preferred embodiment thereof as illustrated in the accompanying drawings in which.

DETAILED DESCRIPTION OF THE PREFERRED EMBODIMENT

Figure 1:
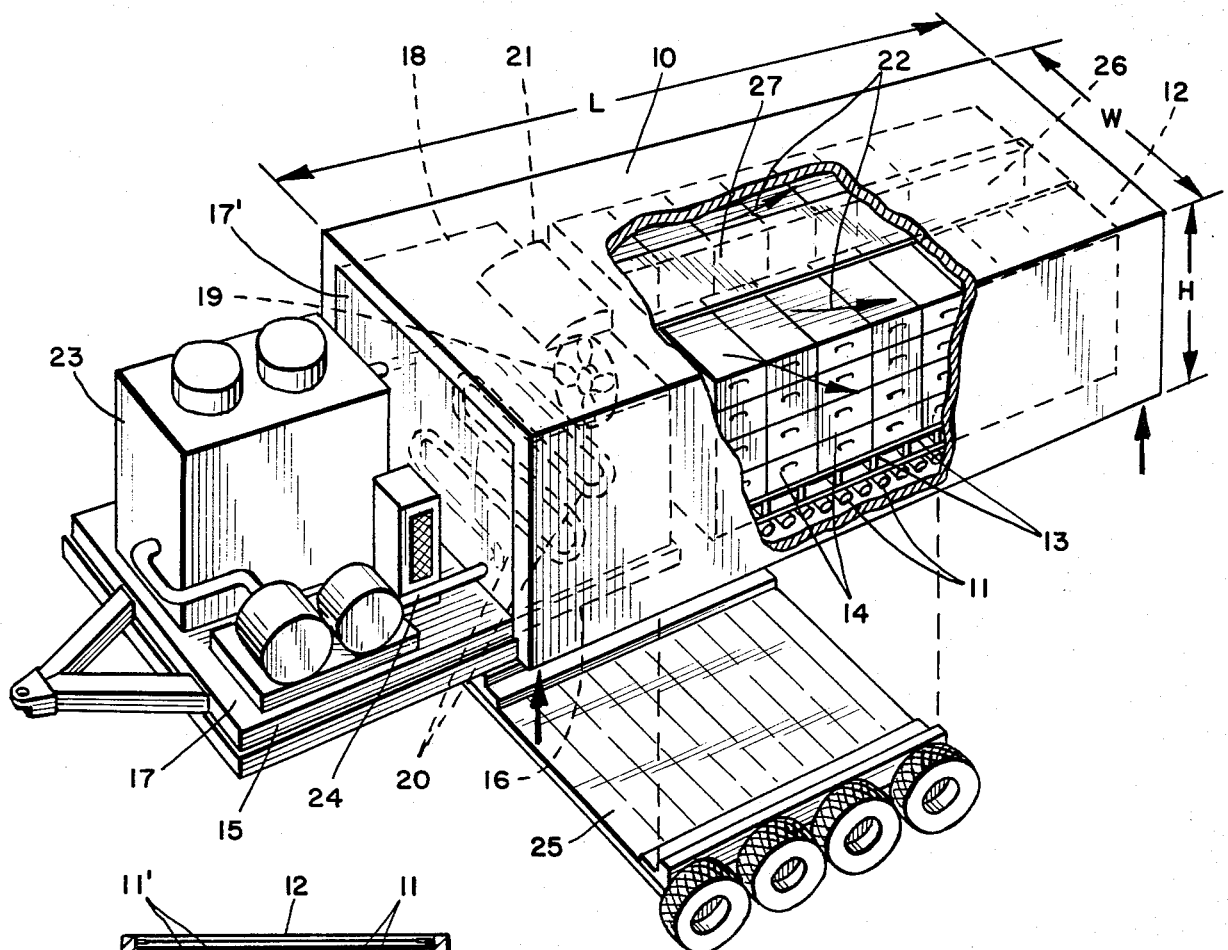
FIG. 1 is an exploded perspective view of the portable field site pre-cooling apparatus of this invention.

Referring first to FIG. 1, the apparatus includes an elongated refrigerated enclosure 10 of given length L, width W and height H. The enclosure 10 includes on its floor as shown in the broken away portion appropriate gravity conveyors 11. The rear of the enclosure 10, in turn, includes a door substantially co-extensive with the width and height of the enclosure for enabling the loading of pallets supporting containers of freshly harvested produce onto the gravity conveyors 11. The referred to pallets are shown at 13 in FIG. 1 and the containers holding the freshly harvested produce are shown at 14.

Referring to the forward portion of the enclosure of FIG. 1, there is shown a movable platform 15 extending partially into the front of the enclosure 10 to define an inside platform area 16 in the enclosure and an outside platform area 17 outside the enclosure.

The inside platform area 16 supports an air handling housing 18 disposed in the interior front end of the enclosure all as illustrated in phantom lines. Housing 18 includes an exhaust fan 19, cooling coils 20 and upper ducting 21. Air from the remaining interior of the enclosure is drawn in by the exhaust fan and passed over the cooling coils so that the air becomes refrigerated air. This refrigerated air is passed out the upper ducting over the tops and around the outer sides and through the containers of produce, all as indicted generally by the arrows 22. Field heat from the produce is removed and the resulting heated air is drawn into the air handling housing 18 by the exhaust fan and the circulation continued. Essentially, a forced air circulation system results The coils are kept refrigerated by appropriate refrigeration equipment designated generally by the arrow 23 supported on the outside platform area 17 in front of the enclosure. This refrigeration equipment is connected as schematically indicated by pipe 24 to the refrigeration coils 20 in the air handling housing 18.

By providing a removable front wall section 17' secured to the platform 17, the entire refrigeration unit 23 along with the air handling housing 18 can be removed as a unitary structure by sliding the platform 17 forwardly. The various units can thus be serviced and then the structure reinserted so as to position the air handling housing 18 in the interior front portion of the enclosure, the movable wall 17' secured to the platform 17 closing the front end as illustrated.

The apparatus described in FIG. 1 is completed by the provision of a detachable dolly 25 normally supporting the enclosure 10 so that it can be transported in the manner of a trailer to a new field site or to a distribution point as desired.

By providing a detachable dolly such as illustrated at 25, when the enclosure 10 is moved to a particular field site, the four bottom corners of the enclosure as indicated by the small vertical arrows in FIG. 1 can be jacked up by conventional house jacks and the dolly 25 removed from beneath the enclosure. In this instance, the enclosure is essentially converted to a more or less permanent position. However, it can easily be moved by jacking the enclosure up and reinserting the dolly 25.

It is desirable to jack up the corners of the enclosure and provide firm foundations when the enclosure is actually being used. In this respect, loading of the enclosure by appropriate fork lifts takes place at the rear, pallets containing stacked containers of fresh produce, being hoisted up and placed on the gravity conveyors 11.

Figure 2:
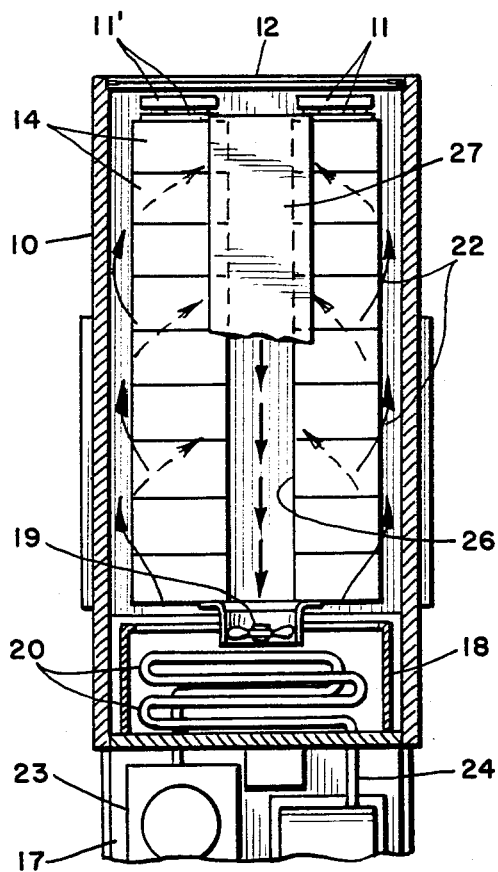
FIG. 2 is a top plan view partly in cross section of the apparatus of FIG. 1; and, FIG. 3 is a fragmentary side elevational view partly in cross section of the apparatus.

Referring to FIG. 2, it will be noted that there are preferably provided two rows of gravity conveyors as indicated at 11 and 11' running longitudinally of the interior of the enclosure in spaced parallel relationship. Pallets with containers of the freshly harvested produce are supported on these gravity conveyor means to define essentially a central longitudinal passageway 26. This central passageway 26 is covered by a strip of material such as tarpaulin 27, this tarpaulin extending along the top of the central passage 26 and thence turning downwardly at the rear to close off the end of the passage as indicated in phantom lines in FIG. 1. The passage 26 is thus confined.

The fan 19 in the air handling housing 18 described in FIG. 1 is shown in FIG. 2 schematically as directly in front of the passage 26; that is, it assumes a central position so that air in this passageway is exhausted or withdrawn by the fan into the air handling housing 18. This air flow is indicated by the arrows in FIG. 2. Because of the confinement of the passageway 26, the reduced air pressure therein as a consequence of the exhausted air will draw in the refrigerated air through the various cartons, this refrigerated air as described passing over the top and down the outer sides of the cartons, all again as indicated by the arrows in FIG. 2. Field heat is thus very efficiently removed by the double row arrangement within the enclosure 10 as illustrated.

With respect to the foregoing, the width of the passage 26 might typically be about 24 inches. The width of each row of cartons on the other hand might be 40 inches, so that by making the overall width W of the enclosure about 11 feet, there will be provided ample passageway space between the interior walls of the enclosure and the outer walls of the various cartons making up the two rows. These passageways in cooperation with the central passageway 26 define the circulating air path.

Figure 3:
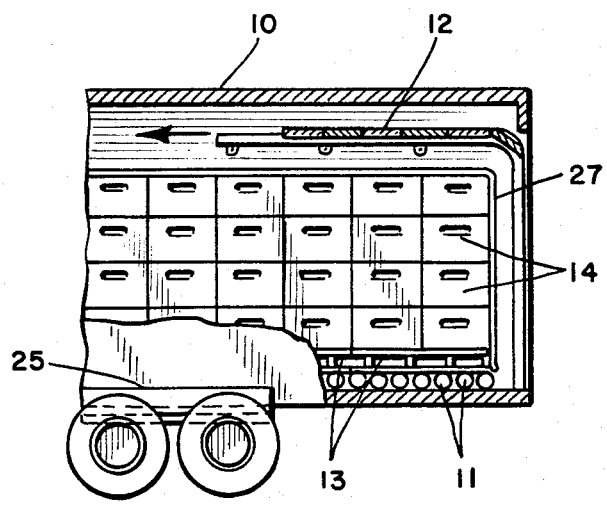

Referring now to FIG. 3, there is shown the rear door 12 of the enclosure 10 in open position. This door may be similar to a conventional garage door and would normally be constructed in the same manner, so that it can be opened and provide a wide access for easy loading and unloading of the pallets containing the cartons.

As mentioned, the overall width of the enclosure might be 11 feet. A typical height H would be 10 feet and the overall length could be up to 48 feet.

Using produce cartons of approximately 20×26 inches×6–8 inches in depth it can be appreciated that several hundred cartons can be accommodated within the enclosure for simultaneous removal of field heat by pre-cooling.

From all of the foregoing, it will now be appreciated that the present invention has provided an apparatus which will substantially reduce the length of time between harvesting of produce and pre-cooling of the same, all with a desirable end in view of providing produce at destination points or retail outlets having a substantially longer shelf life.

I claim:

1. A portable apparatus for pre-cooling produce at the field site where the produce is harvested, including, in combination:
   (a) an elongated refrigerated enclosure of given length, width and height having gravity conveyors on its floor;
   (b) a rear end door substantially co-extensive with the width and height of said enclosure for enabling the loading of pallets supporting containers of freshly harvested produced onto said gravity conveyors;
   (c) a movable platform extending partially into the front of said enclosure to define an inside platform area in said enclosure and an outside platform area outside the enclosure;
   (d) an air handling housing supported on said inside platform area in the front end of said enclosure including an exhaust fan, cooling coils and upper ducting for passing refrigerated air over the tops and around the outer sides and through said containers of produce to remove field heat from the produce, the resulting heated air being drawn into said air handling housing by said exhaust fan;
   (e) refrigeration equipment supported on the outside platform area outside said enclosure connected through the front of said enclosure to said cooling coils; and,
   (f) a detachable dolly supporting said enclosure so that it can be transported in the manner of a trailer to a new field site if desired.

2. An apparatus according to claim 1, in which said gravity conveyors are arranged in two spaced parallel longitudinal rows in said enclosure so that pallets and containers of produce supported on the gravity conveyors define a central longitudinal passageway, said exhaust fan being essentially positioned in said air handling housing in the front of the enclosure to withdraw air from the passageway into the housing so that said refrigerated air is drawn through the containers into the central passageway whereby the field heat in all of the containers is removed.

3. An apparatus according to claim 2, including a covering extending along the top of said passageway and down over the rear thereof so as to confine the passageway resulting in air being drawn through the various containers.

4. An apparatus according to claim 2, in which the length of said enclosure is approximately 48 feet, the width of the enclosure is approximately 11 feet, and the height of the enclosure is approximately 10 feet.

* * * * *